July 2, 1935.  W. W. HARTMAN  2,006,551
FEED CONVEYER
Filed July 11, 1931  7 Sheets-Sheet 1

Inventor
William Walter Hartman.

Attorney.

July 2, 1935.  W. W. HARTMAN  2,006,551
FEED CONVEYER
Filed July 11, 1931    7 Sheets-Sheet 2

Inventor
William Walter Hartman.
Attorney.

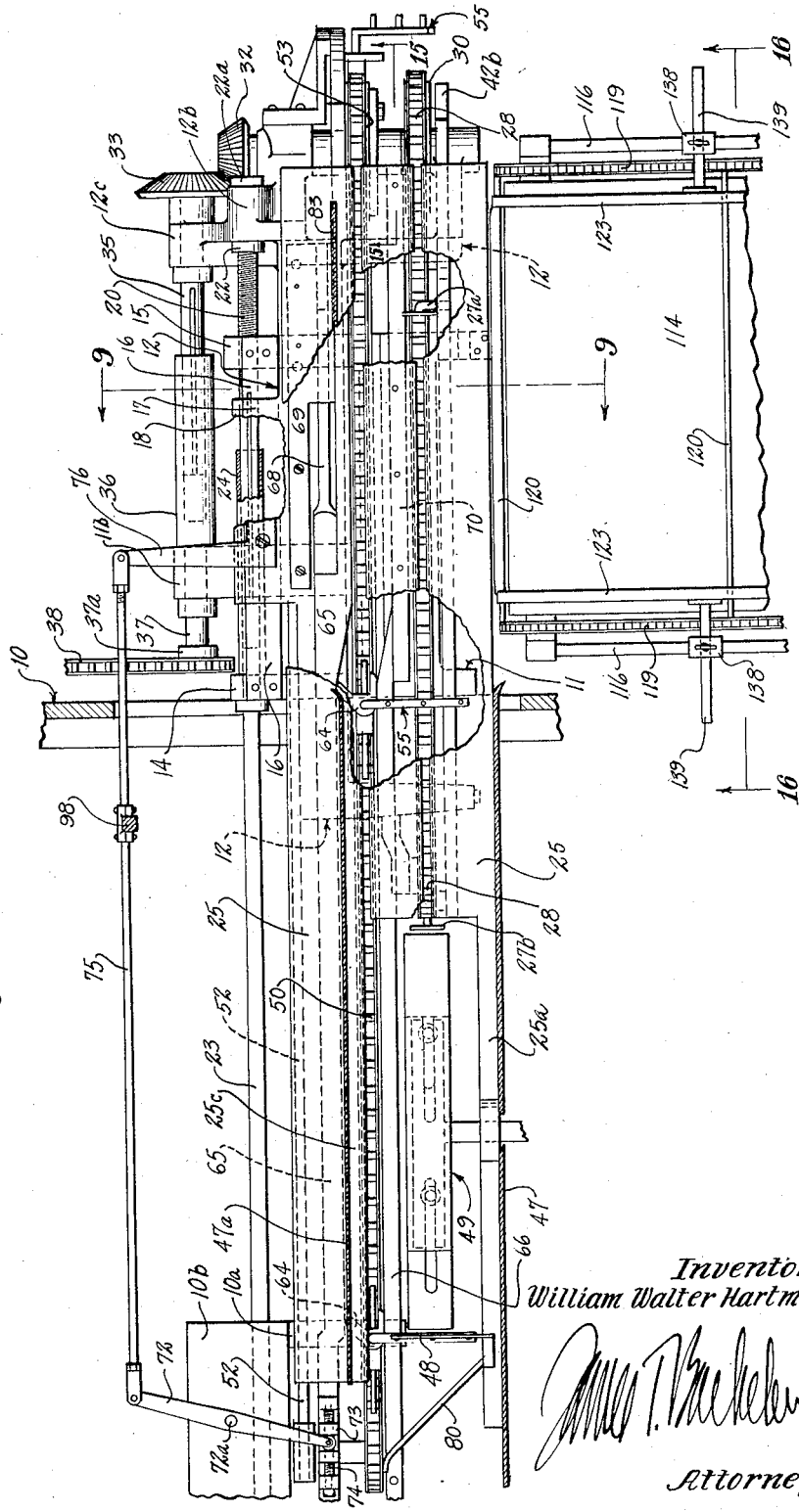

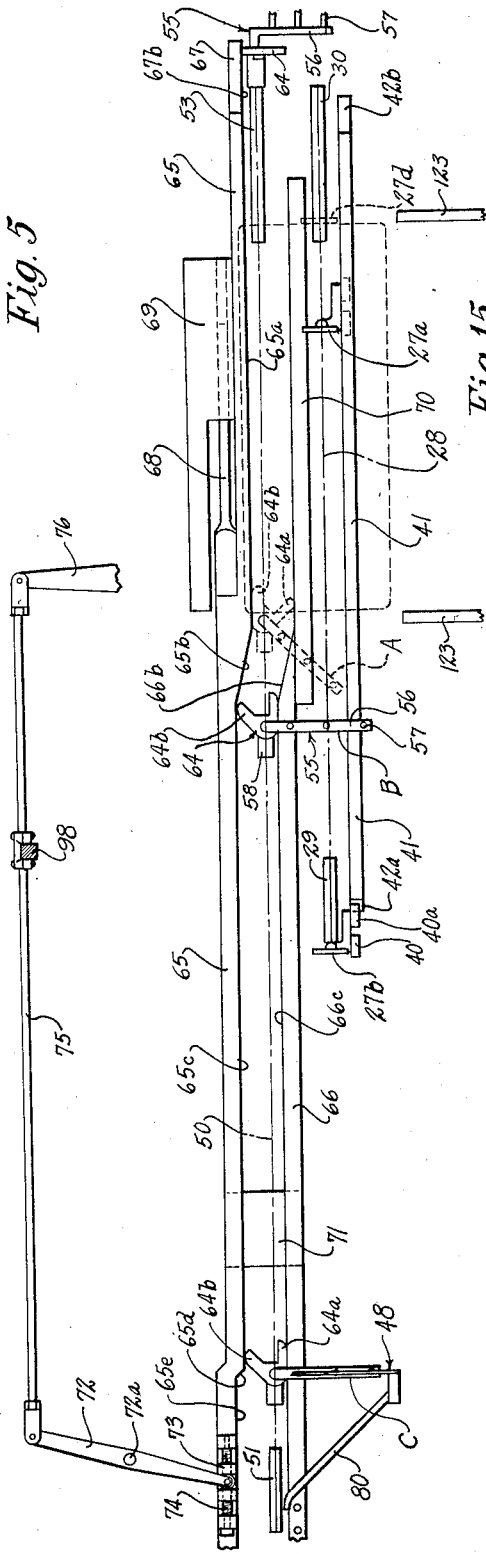

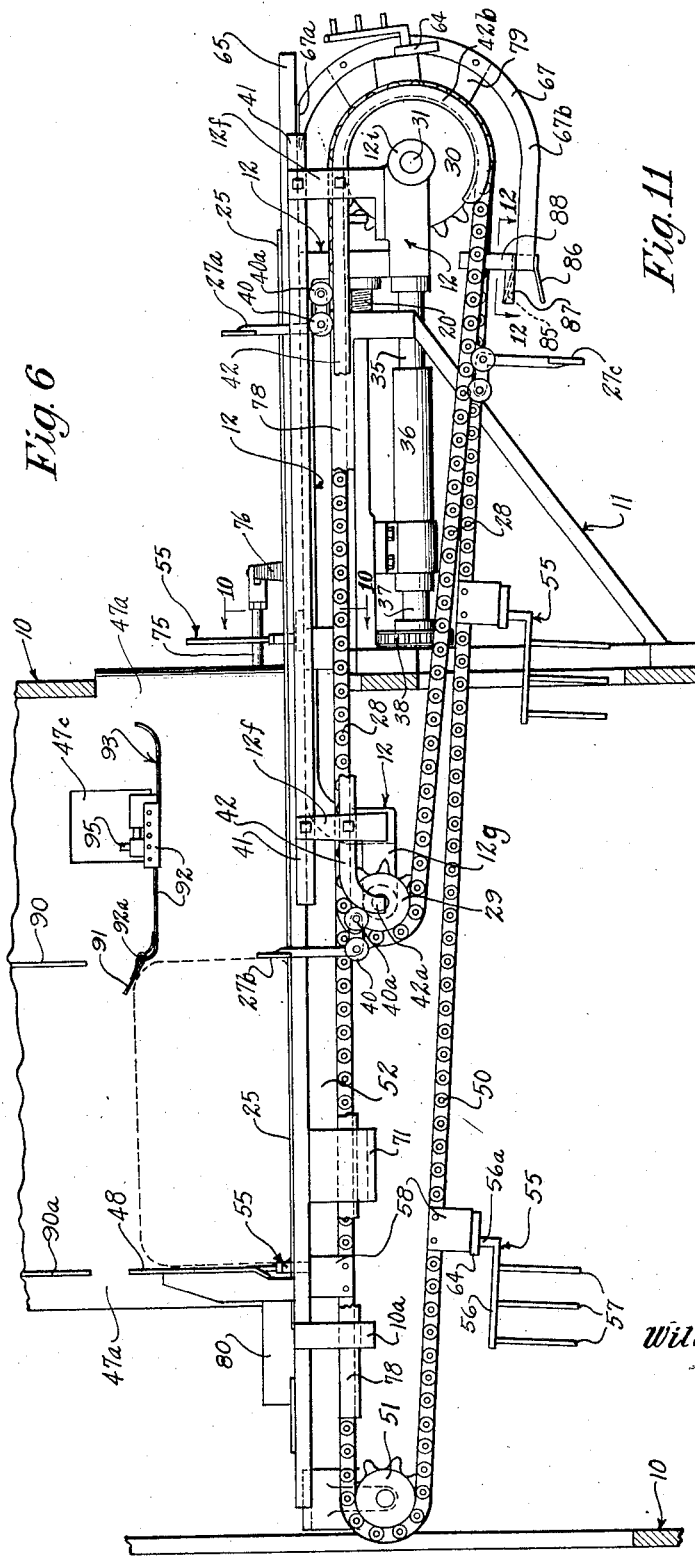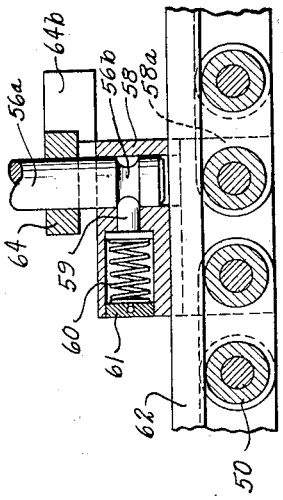

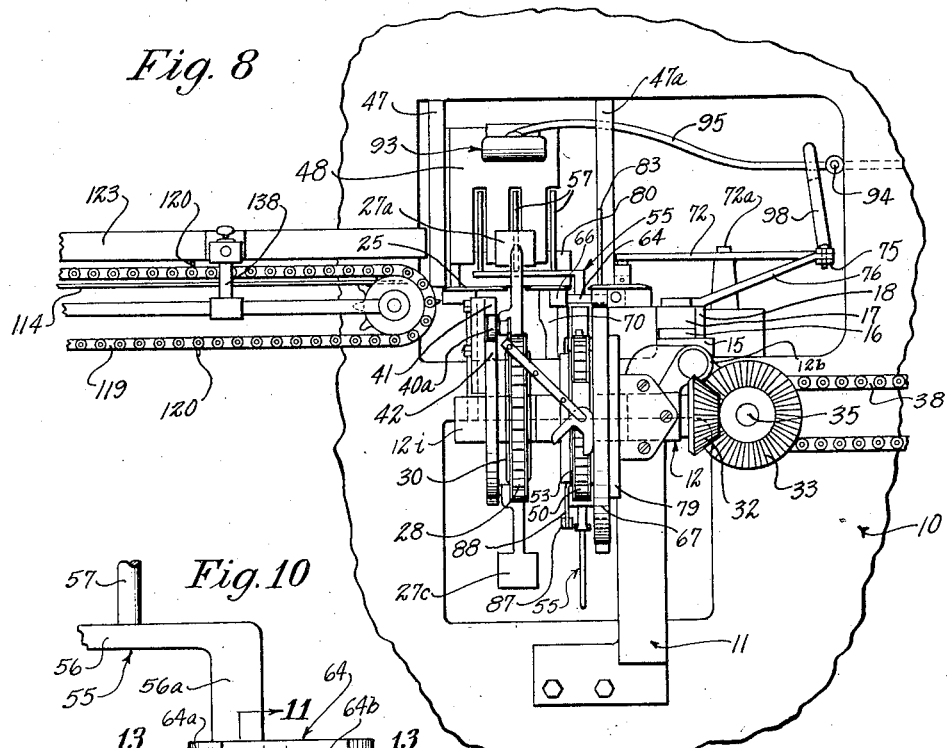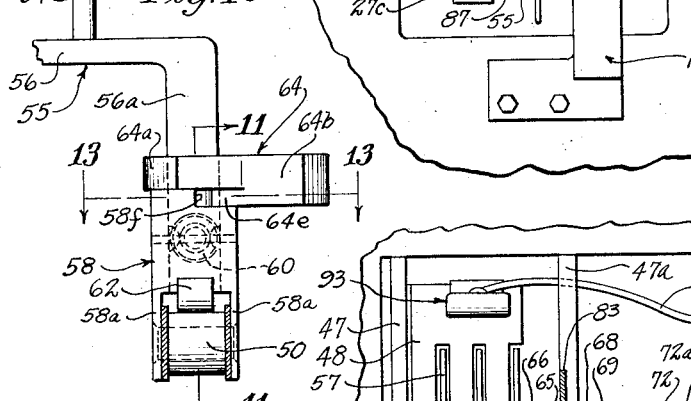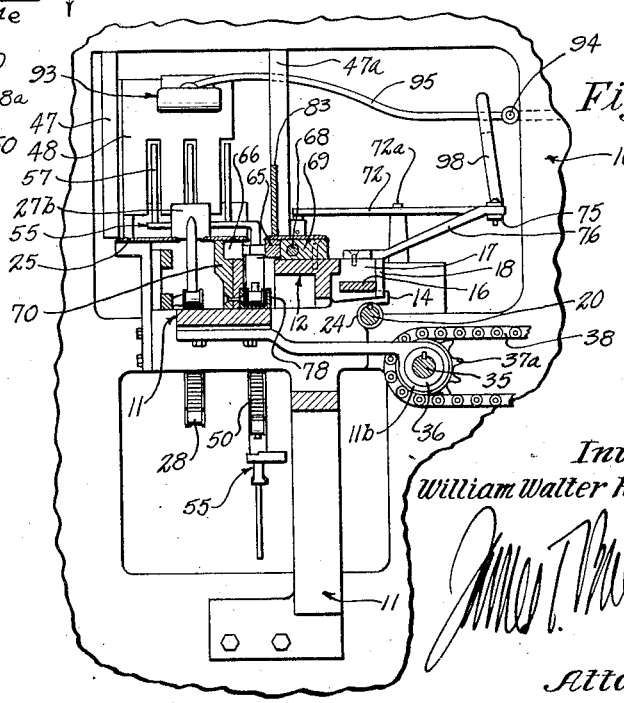

Patented July 2, 1935

2,006,551

UNITED STATES PATENT OFFICE 2,006,551

FEED CONVEYER

William Walter Hartman, Los Angeles, Calif.

Application July 11, 1931, Serial No. 550,199

16 Claims. (Cl. 198—168)

This invention has to do with such machines as bread slicers and wrappers and with conveying means for moving a sliced loaf from the slicer into the wrapper to the point where the sliced loaf is wrapped, holding the slices together without the necessity of using a tray or band or similar appliance for temporarily holding the slices until wrapped. The invention has been made and designed particularly with a view to the slicing and wrapping of bread, and will be more particularly described in that relation; although it will be understood that the invention, in its various aspects, is not necessarily limited to operations upon loaves of bread, but is capable of application wherever any article is to be subdivided and wrapped or where any subdivided article, or group of articles, is to be moved or conveyed as a unit without relative displacement.

With these understandings in mind I shall proceed to describe the invention more particularly as applied to the slicing and wrapping of bread. Heretofore, when a loaf of bread has been sliced, it has been common to apply to the sliced unit a tray or band, usually applied by hand. This tray or band has performed the function of holding the sliced unit together while it is being carried or conveyed from the slicer to the wrapper, and while it is being moved into and through the wrapper to the wrapping point. When the wrapping is once applied it, of course, holds the unit together from that point on through the remainder of the operations. This prior practice has necessitated what I conceive to be unnecessary labor and cost of the tray or bands utilized.

It is a general object of my invention to provide automatic mechanisms which, in any such case as that above outlined, will save the labor and appliance cost of manual operations and of temporary appliances for holding the sliced or aggregated unit.

The invention has several different aspects which may again be understood by reference to the typical, but not limitative, application of the invention to operation on bread. One of the aspects of the invention has to do with the provision, in combination with a slicing mechanism and a wrapping mechanism, of entirely automatic means which takes the sliced unit from the slicer and conveys it into the wrapper to the point of wrapping, holding the sliced unit at all times in unitary form.

Another aspect of the invention is that concerned more directly with the wrapping mechanism and the provision of an in-feed therefor which, in combination with the wrapping mechanism, will take a sliced unit and feed it into the wrapper to the point of wrapping, holding the slices in unitary relation.

And a third aspect of the invention is the particular provision of a new type of feeding mechanism in itself.

The objects of the invention, in its various aspects, are accomplished by providing automatic conveyer mechanism taking the sliced loaf from the slicer and delivering it into the wrapper to the wrapping point, all in synchronism with the operations of the slicer and wrapper. What I refer to as the wrapper infeed forms an element of this conveying mechanism; this wrapper infeed is so constructed that, taking the sliced loaves from the slicer conveyer, it holds the slices in unitary relation and feeds them into the wrapper in such relation to the action of the wrapper mechanism as to keep the slices always in unitary relation. And this wrapper infeed is furthermore so constructed that, without changing its cooperative relations with either the slicer and the delivery of slices therefrom, or the wrapper and its mechanism which picks up the sliced unit from the infeed mechanism, the infeed mechanism may be adjusted to take various sizes and lengths of loaves.

Furthermore, the infeed mechanism is so cooperative with the wrapper mechanism that when the infeed mechanism delivers the sliced unit, the wrapper mechanism takes the sliced unit, whatever its size, and, holding it in unitary relation, carries it through the operations of the wrapper mechanism to the wrapping point.

The general outline, as well as details, of mechanism by which the objects of my invention in its various aspects are accomplished, will be better understood from the following detailed description of the present preferred forms and arrangements, rather than from any preliminary general description. I proceed immediately therefore to a full and detailed description of the present preferred mechanisms, which are illustrative and typical of my invention, and from an understanding of which the invention itself may be best understood. For this purpose I refer to the accompanying drawings in which:

Fig. 3 is an enlarged plan view of the infeed conveyer on line 3—3 of Fig. 2, certain parts being broken away;

Fig. 5 is a diagrammatic plan view of the infeed showing the pusher arms, the gates, and the cams for swinging the gates;

Fig. 6 is an elevation on line 6—6 of Fig. 4 certain parts being omitted;

Fig. 8 is an end elevation of the infeed conveyer as viewed from the right of Fig. 6;

Fig. 9 is a vertical section on line 9—9 of Fig. 3;

Fig. 10 is an enlarged elevation of the gate mounting block on line 10—10 of Fig. 6;

Fig. 11 is a vertical section of the gate mounting block on line 11—11 of Fig. 10;

Fig. 12 is a plan view on line 12—12 of Fig. 6 of the lower end of a cam, a follower and gate being shown diagrammatically in two successive positions;

Fig. 13 is a plan view on line 13—13 of Fig. 10 with the cam follower turned forward 45°;

Fig. 14 is a plan view similar to Fig. 13, with the cam follower turned backward 90°;

Fig. 15 is an elevation of the chain adjusting sprocket on line 15—15 of Fig. 3;

Figure 1:
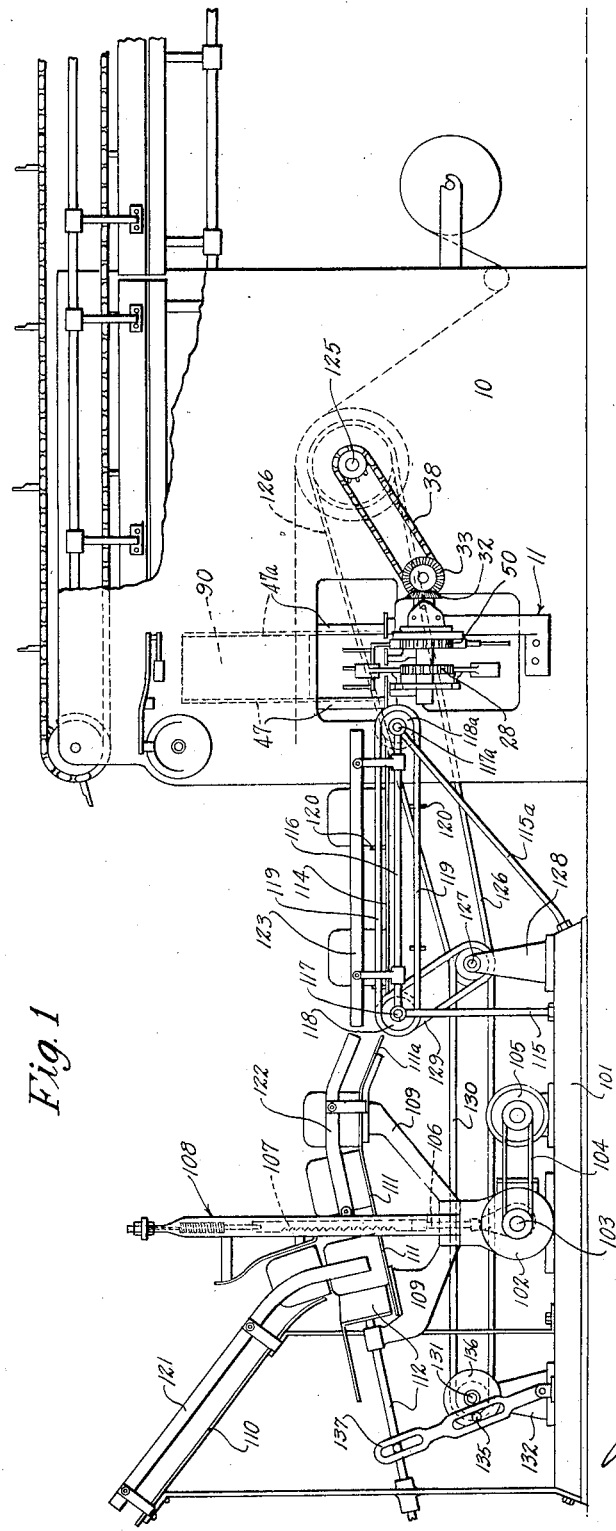
Fig. 1 is an elevation of a slicer, delivery conveyer, and wrapper arranged and constructed according to my invention.

Fig. 1 illustrates a typical preferred arrangement of a slicer, a delivery conveyer, and a wrapper with my new infeed, all arranged and constructed according to my invention. As illustrative of such slicers as may be used, but without limitation thereto, I show and briefly describe a preferred form, reference being had for a detailed description to my copending application, Ser. No. 544,429, filed June 15, 1931, for Synchronous slicer and wrapper feed; and to my Patent No. 1,925,143, issued September 5, 1933, for Bread slicers.

Mounted on base 101 is crankcase 102 within which is journaled eccentric-shaft 103 driven from motor 105 by belt 104. Connecting rods 106 are attached to the eccentric-shaft and to the lower ends of the horizontally spaced slicing knives 107 to reciprocate vertically the knives. Knives 107 are spring supported at their upper ends from frame 108 on crankcase 102. The unsliced bread is initially placed on chute 110 down which it slides by gravity onto plate 111 carried on bracket 109 on the crankcase. From this position on plate 111, the loaf is moved along the upwardly inclined portion by ram 112 until it has passed the knives. The sliced loaf remains in the advanced position upon retraction of the ram. Further advancement of the loaf is secured by pressure of succeeding loaves, the first loaf finally sliding down incline 111a to be deposited upon the plate 114 of the delivery conveyer.

Figure 16:
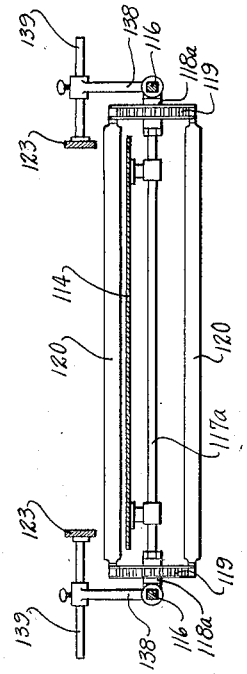
Fig. 16 is a vertical section of the delivery conveyer only on line 16—16 of Fig. 3.

This delivery conveyer has a frame made up of supports 115 and 115a rising from base 101 and joined at their upper ends by longitudinal rods 116 and transverse rods 117 and 117a (Figs. 1 and 16). Plate 114 is suitably supported on transverse rods 117 and 117a. Rod 117 at one end forms a drive shaft to which two sprockets 118 are attached, one on each side of plate 114, while at the other end of the conveyer two similar sprockets 118a are mounted on rod 117a to turn loosely. On sprockets 118 and 118a are chains 119 paralleling plate 14. Carried on and between chains 119 are cleats 120 which advance the sliced loaf along plate 114 and onto the wrapper infeed. End rails 121, 122 and 123 are provided to guide the loaves and to hold the slices in unitary relation during the travel from the slicing knives onto the wrapper infeed.

The operations of the slicer and delivery conveyer are synchronized with each other and with the wrapper by driving them from the wrapper power shaft 125 in timed relation with the wrapper mechanism. From the wrapper power shaft, which may be driven by any means, chain 126 drives a secondary shaft 127 in bearings 128. From this secondary shaft, the delivery conveyer is driven by chain 129 passing over a sprocket on shaft 117; and the slicer ram is driven by chain 130 passing over a sprocket on shaft 131 journaled in bearing 132. A pin 135 in disk 136 on one end of shaft 131 causes arm 137, pivoted at its lower end to base 101, to oscillate and thus to reciprocate ram 112. By this arrangement, the loaves are sliced and deposited on the delivery conveyer at the proper time and rate; and subsequently the loaves are placed on the infeed at the proper time to be fed into the wrapper.

Figure 2:
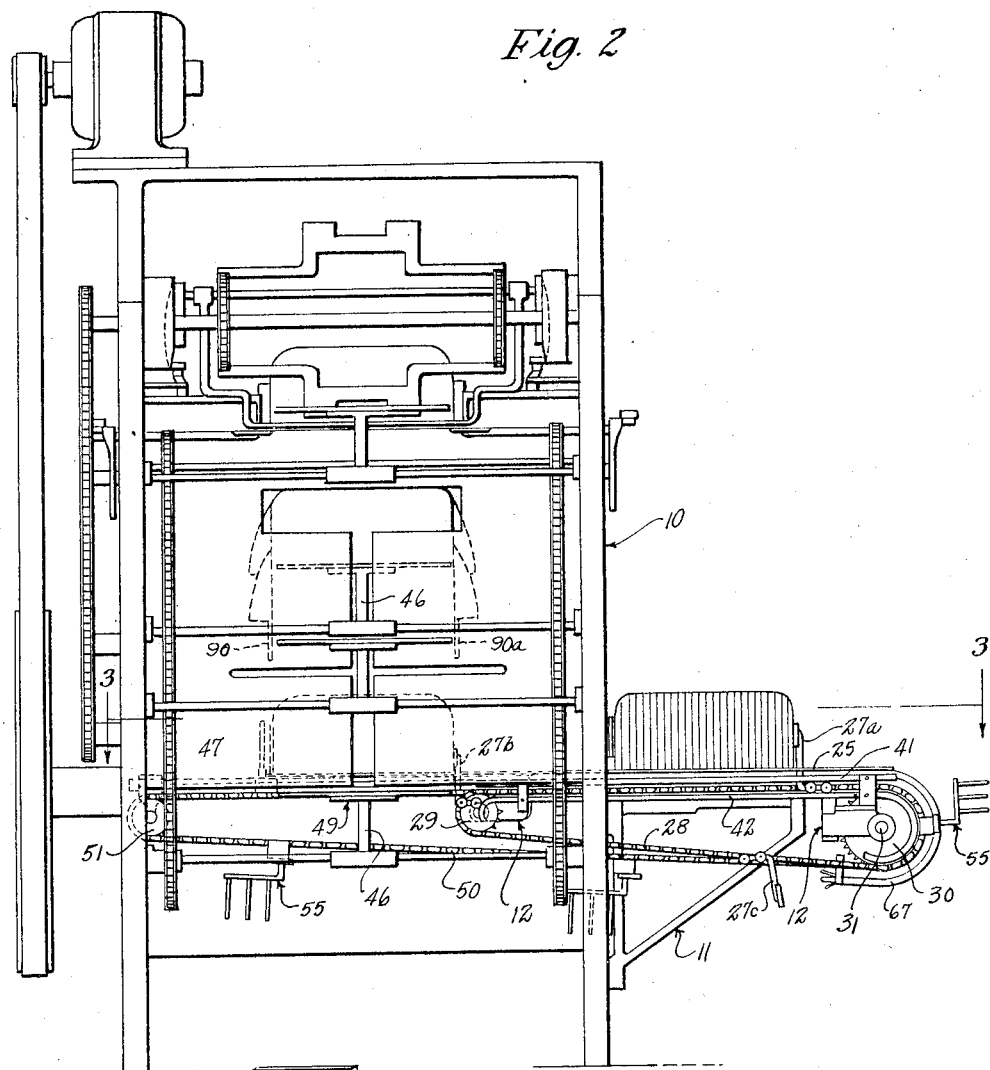
Fig. 2 is an end elevation, as viewed from the left of Fig. 1, of a wrapping machine showing a wrapper and an infeed conveyer constructed according to my invention.

I shall now describe the wrapper and infeed. Fig. 2 illustrates a wrapping machine as viewed from one end and shows the location of the infeed conveyer with a loaf of sliced bread thereon, the delivery conveyer being omitted. The frame of the wrapper is generally designated at 10 and has attached to it the bracket 11 supporting the infeed. Upon bracket 11 is slidably mounted carriage 12 of an irregular shape. The carriage is adjustable lengthwise of the conveyer with respect to frame 10, but forms a body to which most parts of the conveyer are attached and hence is fixed with respect to them. The carriage is made adjustable to accommodate loaves of various length, and since it is found so only on wrapping machines adjustable to loaves of various sizes, my invention is not to be construed as limited thereto. The adjustments required for loaves of different lengths will be explained in the latter part of this description.

Figure 4:
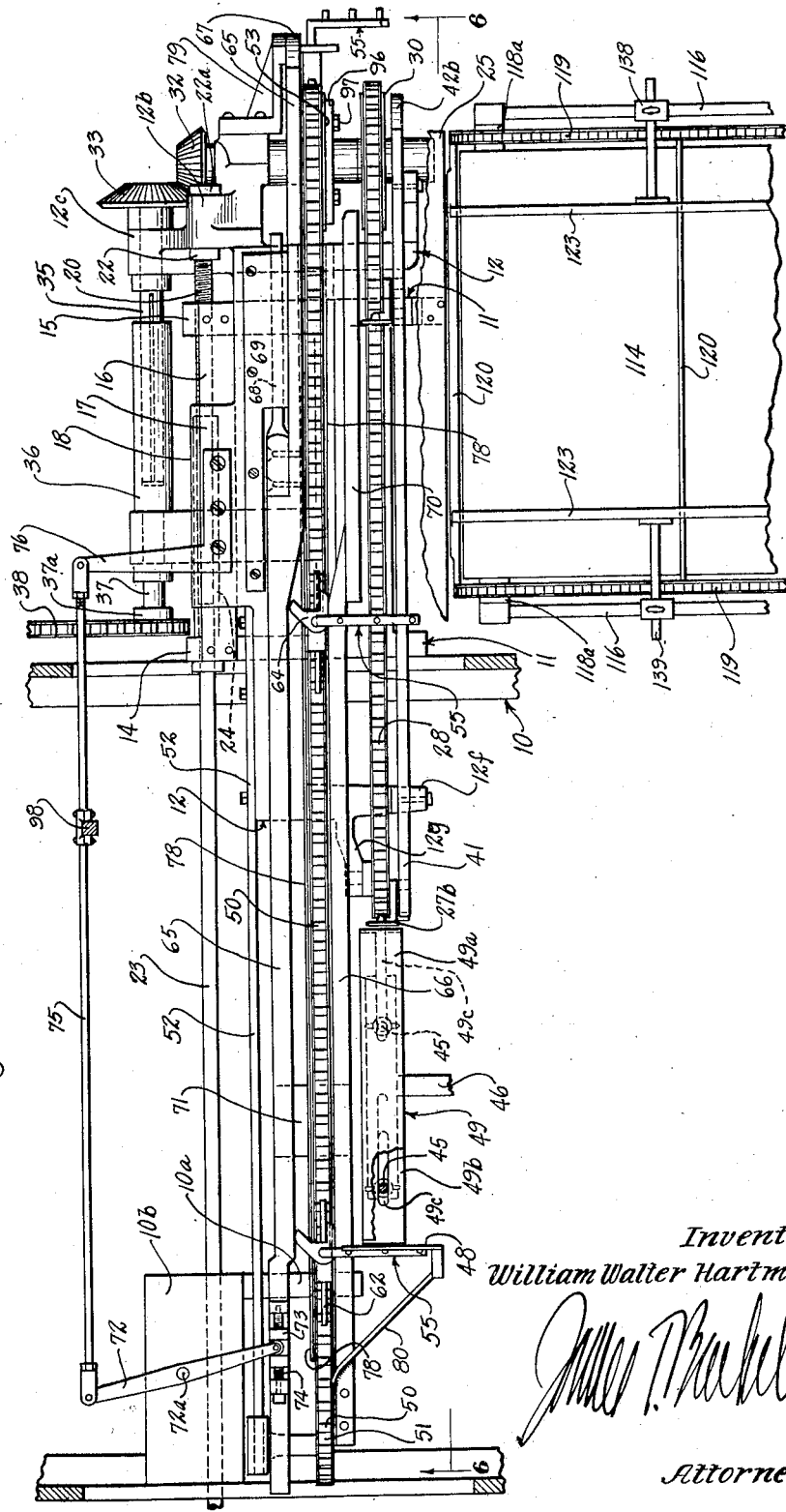
Fig. 4 is a plan view similar to Fig. 3, with the parts in position to accommodate a relatively shorter loaf, and with certain parts omitted for simplicity of illustration.

The mounting of carriage 12 is shown in Figs. 3 and 4 which illustrate the conveying means in plan. Integral with bracket 11, are bosses 14, 15 that support rectangular bar 16. The projection 17 of carriage 12 is provided with a slot, closed by plate 18, which receives with sliding fit bar 16 so that bar 16 forms the carriage support along which the carriage is slidingly adjustable. The movement of carriage 12 is controlled by lead screw 20 which is threaded into fixed boss 15 and is rotatably attached at one end to boss 12b of the carriage by collars 22 and 22a pinned to the lead screw. As the screw is turned by means of shaft 23, the lead screw is advanced or retracted through boss 15 and the carriage is moved along bar 16 by the travel of the cutter end of the screw. One end of shaft 23 carries a sleeve 24 splined to the end of lead screw 20 so that shaft 23 remains fixed and endwise motion of the screw relative thereto is permitted.

The slotted surface plate 25, shown broken away in Fig. 3 and omitted in Fig. 4, is attached to bracket 11 and is the surface along which the sliced loaf is moved into the wrapper. The loaf propelling means and its drive are best illustrated in Fig. 6. The bread is advanced by pusher arms 27a, 27b and 27c carried by chain 28 which passes around idler sprocket 29 and drives sprocket 30; idler 29 being mounted on a shaft journaled in bosses 12g at the inner end of carriage 12 while sprocket 30 is mounted on drive shaft 31 journaled in bearings 12i at the extreme outer end of carriage 12. On one end of shaft 31 is keyed bevel gear 32 (Fig. 3) meshing with bevel gear 33 on shaft 35. Shaft 35 is journaled in boss 12c of the carriage and is driven by sleeve 36 on the end of shaft 37 journaled in bracket 11b on the main supporting bracket 11. Sleeve 36 is splined to shaft 35. Power to drive conveyer chain 28 through the just described means is supplied from the wrapper power shaft 125 by chain 38 passing over sprocket 37a on shaft 37. All the moving elements of the wrapper are driven in timed relation from the power shaft 125, and by driving the infeed from the same power source it will be appreciated that the infeed thereby operates in synchronism with the wrapper elements as well as with the slicer and delivery conveyer.

Figure 7:
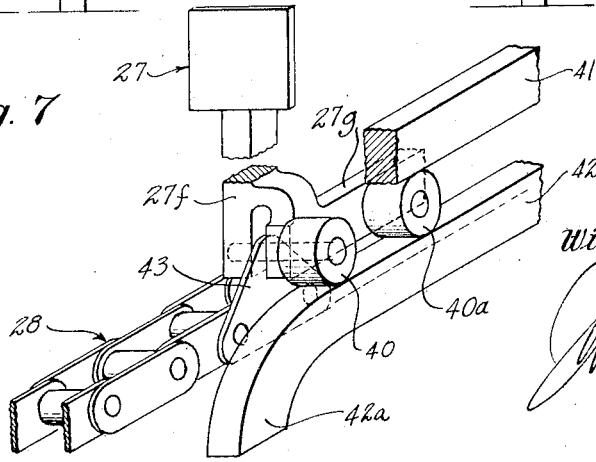
Fig. 7 is a detached perspective view of a pusher arm showing its construction and mounting.

The construction and operation of all the pusher arms is the same and may be seen in Figs. 6 and 7. Each pusher comprises an angular member having leg 27f upright when in the operative position, (see pushers 27a and 27b) and a correspondingly horizontal leg 27g offset from chain 28 and upon which are mounted two rollers 40 and 40a, the angular member being pivotally attached to a triangular plate 43 on chain 28 by the pin of roller 40 as shown in Fig. 7. The triangular attaching plate 43 is fastened to the chain by a pair of the usual chain pins. The pusher arm is thus pivoted about a single point, the axle of roller 40, and may be rotated about this point, the position of the arm being determined by guide means operating by contact with rollers 40 and 40a. Bolted to portions 12f of carriage 12 at one side of chain 28 and in vertical alinement with rollers 40, 40a, are upper and lower track bars 41 and 42, respectively, which are so positioned as to receive rollers 40, 40a between them during the time the arms are pushing bread into the wrapper and so hold the pusher arm upright against the loaf end. Lower track bar 42 is curved downward at both ends for reasons that later will be set forth.

The bread is delivered onto plate 25 of the infeed conveyer by the slicer discharge conveyer or other suitable delivery means of which a typical form is here shown. The loaf is deposited on plate 25 and then advanced into the wrapper by pressure of the pusher arms. Thus, when pusher 27a is traveling forward, the presence of track bars 41 and 42 above and below rollers 40, 40a, keeps its arm 27f vertical. The loaf advances into the wrapper between vertical side plates 47 and 47a, which are part of the wrapping elements, until it reaches end stop 48 which stops the loaf in registration with elevator 49 to be picked up by the elevator and carried through the wrapping means. This stopping of the loaf requires that the pusher arm, now at 27b, be moved laterally away from behind the loaf. Such motion is secured by so curving the adjacent end 42a of the lower track bar that only roller 40a rides thereagainst as the arm moves downwardly around sprocket 29 in the manner shown at 27b. After passing sprocket 29, the pusher arm falls by gravity until it is dependent from chain 28 as at 27c but has the same position relative to the chain as it had up above. It is to maintain this same relative position that the outer end 42b of lower track bar 42 is bent to conform to the periphery of sprocket 30. As a result, rollers 40, 40a engage the undersurface of the end 42b of track bar 42 and ride around the curve so that when the pusher arm is again on top, the pusher is once more upright as when at 27a, and the rollers are again confined between the track bars. The pusher arms are equi-distant on chain 28 and are here shown as three in number though a different number may be used if convenient.

The part of the infeed already described is known in the art and no claim is laid to it as such, but is shown and described so that a clear understanding of my invention may be had; and it will be understood that my invention is not necessarily limited thereto.

Referring again to Figs. 3, 4 and 6, it is seen that there is provided a second chain 50 paralleling chain 28 but extending beyond stop 48. The inner end of chain 50 passes over sprocket 51 mounted on extension bar 52 which is attached to and forms a part of carriage 12 so that idler sprocket 51 is adjusted in and out with carriage 12. The outer end of chain 50 passes over drive sprocket 53 fastened to shaft 31 and driven thereby in conjunction with chain 28. A support for the inner end of extension bar 52 is provided by arm 10a on bracket 10b which forms part of the wrapper frame. Extension 52 slides over the stationary support 10a when the carriage is moved.

Mounted on chain 50 is a plurality of gates generally indicated at 55. Each is composed of a horizontal bar 56 with some vertical fingers 57 set in it, bar 56 having a shank portion 56a bent to form a pivotal mounting in mounting block 58, the details of which are illustrated in Figs. 10 and 11. The top of block 58 has a bore to receive the rounded shaft 56a of the gate so that it may turn with respect to the block and chain. Shank 56a is grooved at 56b and a rounded pin 59 is pressed by spring 60 into the groove so that the shank is releasably held in place. The bore containing spring 60 is closed by a plug 61 pinned to the mounting block. The gates are thus easily removed by merely lifting them from the mounting blocks, and when removed, the conveyer mechanism can continue to operate without them, using the pusher arms only. A second function of pin 59 is to frictionally engage shank 56a to keep gate 55 from swinging too freely. As will become apparent later in the description, the gate is so mounted as to be turned by suitably placed cams, but is preferably not so free to swing as to be jarred out of a set position by the vibration of the machine.

Block 58 has two depending flanges 58a, adapted to fit over the chain as shown. The block is fastened to chain 50 by removing a pair of link plates and substituting flanges 58a, using the regular chain pins to fasten the parts together. Attached to the under side of block 58 and extending for a link or so along the top of the chain each way from the block, is bar 62 which serves to keep the block always at right angles to the chain by preventing pivoting of the block on the chain pins. The gate is thus held rigidly perpendicular when in the operative position.

Gates 55 are to hold up the slices at the advancing end of the loaf, and thereby to hold the loaf in unitary relation. To do this, the gates are rotated at predetermined points in their travel through definite arcs. I prefer to do this by means of cams actuating cam follower 64 fastened on gate shank 56a just above the mounting block. Each follower has two legs 64a and 64b (see Figs. 5, 10, and 13) which extend horizontally and have rounded corners as shown.

The cams to move these followers, see Figs. 3, 4, and 5, are the irregularly shaped bars 65 and 66 which extend along the top horizontal portion of chain 50, and the generally semicircular bar 67 that extends along a portion of the circumference of sprocket 53. Cam 65 is supported at two points; at its left end (as viewed in Figs. 3 and 4) it has a guide and support in arm 10a over which it can slide, and over the carriage proper the cam is supported by the attached pin 68 which slides within guide 69 screwed to carriage 12. Cam 66, which is shorter than cam 65 but parallels the latter, also slides at one end on arm 10a and at the other is supported and guided by the fixed guide bar 70 attached to carriage 12. A U-shaped connecting member 71 (Fig. 4) that passes under chain 50, connects the two cam bars together and keeps them in the same relative position longitudinally.

By this construction it will be seen that cams 65 and 66 are fastened together and are capable of longitudinal motion relative to the wrapper frame and to the carriage, since they are slidably mounted on each. The position of cams 65 and 66 is fixed by lever 72 pivoted at 72a to bracket 10b of the frame. One end of lever 72 engages traveling block 73 on adjusting screw 74 secured to cam 65, and the other end of the lever is attached to rod 75 which is connected to the fixed arm 76 attached to the portion 17 of carriage 12. The reasons for this construction will be apparent later.

The cams 65, 66 and followers 64 are so positioned as to be in horizontal alinement, one cam on either side of the followers. A channel 78 (shown only in Figs. 4, 6 and 9) is supported on the carriage and cam connecting member 71 to provide a track in which chain 50 rides. This prevents the followers dropping below the cams because of sag in the chain.

The semi-circular cam 67 (see Fig. 6) is fastened to carriage 12 by angle bracket 79 and coincides with the path of the followers 64 as they pass around sprocket 54. Cam 67 is beveled at the top at 67a where it comes adjacent to cam 65 so that the latter cam may move lengthwise over cam 67 when the carriage is moved and yet the passage of the followers from one cam to the other is not interrupted.

Cam 65 carries on its inner end the bread stop 48, one edge of the stop being supported directly on the cam bar and the other by diagonal brace 80. Stop 48 consequently moves in and out with the cam 65.

In the ensuing description of the operation of the cams and gates, reference will be had mainly to Fig. 5 which shows diagrammatically the principal parts in the position of Fig. 3, but detached from the rest of the mechanism.

The bread is brought to the infeed conveyer by a delivery conveyer. In the case here illustrated the loaves are moved along the conveyer platform 114 by cleats 120 which extend across the full length of the loaf and keep the slices alined. End rails 123 adjustably mounted on rods 139 in brackets 138 hold the slices together while on the platform. Cleats 120 serve as a means to push the loaf sideways onto surface plate 25 This action is timed to occur just as a pusher arm is moving up to the position shown in dotted lines in Fig. 5 at 27d and serves to insert the loaf between a gate at A in Fig. 5 and the pusher which is in the position shown at 27d, as shown by the loaf in dotted lines in that figure. This position will be termed the initial loaf position on the infeed. It will be at once apparent that no difficulty arises from placing the loaf ahead of the continuously advancing arm alone. There is, however, a different situation in moving the loaf into position behind the gate 55 which is moving in a direction at right angles to the motion of the loaf and which has a considerable dimension parallel to the motion of the loaf. Furthermore, the loaf must be inserted between the gate and arm, spaced a loaf length apart, while they are moving. To reduce the effective width of the gate at this time, the gate is pivoted at one edge over the center line of chain 50, which runs close to the leading edge of the loaf in its initial position on the infeed; and the gate is swung, on this pivot, away from the end of the loaf. The amount of this swing may be anything suitable depending on relative loaf and chain speeds, but is here shown typically at A as 45°.

This inclination of the gate to the path of the loaf allows the loaf to be started onto plate 25 immediately after the leading corner of the gate clears the path of the bread and in time for the loaf to be fully positioned against stop plate 83 (Figs. 3 and 9) before a pusher arm touches the loaf. Relative to the gate A, the nearest corner of the loaf moves approximately parallel thereto and the loaf is inserted behind the pivot 56a, to fit snugly between the pusher arm behind and the gate ahead. If the leading corner of the loaf does touch the gate, the loaf will ride along the gate as it advances and, because of the inclination of the gate, will be pushed into proper position against the pusher arm. This fact allows a slight latitude in timing the movement of the loaf relative to the pusher so that the loaf is certain to be placed ahead of the arm.

In order to hold the gate in the inclined position as it moves along to the left (of Fig. 5) to position A, cam face 65a is placed closer to the chain than the edge of bar 70 which defines the other side of the follower passage. This causes the flat side face of follower leg 64b to ride against face 65a and the gate is held firmly in the diagonal position shown at A. The contact of the rounded corner of leg 64a with bar 70 prevents excessive rotation.

Additional stop means to limit the swing of the gate is illustrated in Figs. 10, 13, and 14. Fig. 10, in which the gate is shown as at B, shows that a portion of the top of mounting block 58 is raised and provides a vertical, longitudinal face 58f extending along the center of the block. Follower leg 64b is thicker than leg 64a by the height of face 58f, and provides two vertical faces 64e and 64f, having an included angle of 45°, each of which will contact face 58f to limit the swing of the gate. In Fig. 13 the gate is shown turned forward 45° as in position A thus bringing follower face 64e into contact with block face 58f. The complete follower and the gate positions are indicated by the dash-dot lines.

Moving on from position A to position B, which are two successive positions of the same gate, the follower passes between the inclined cam faces 65b and 66b which rotate the gate backwards through 45° to bring it against the loaf end. The inclination of face 65b is away from the follower, releasing leg 64b, and the inclination of face 66b is toward the follower, so that the follower is rotated until the flat side surface of leg 64a rides against the cam surface 66c. Cam 66 is now the closer of the cams to chain 50.

The location of the beginning of the inclined cam faces 65b and 66b is determined by the initial position of the loaf on the conveyer and is near the forward end of the loaf or at a point approximately on the prolongation of the left-hand rail 123. The point of best operation may be secured by turning adjusting screw 74 which causes the cams 65 and 66 to move together along carriage 12, block 73 being held fixed by lever 72.

As the gate is moved forward from B, it is held in position against the loaf; the rounded corner of leg 64b riding along cam face 65c and side of leg 64a along face 66c rotation of the gate until the inclined face 65d, opposite stop plate 48, is reached. The gate is now in the position C of Fig. 5 where the loaf has just been brought into register with the means for carrying it through the wrapping elements. The loaf, having reached stop 48, is detained in this position, though the gate passes on, and the pusher behind the loaf is withdrawn downwardly from the pushing position as shown in Fig. 6.

As the gate passes beyond stop 48, it strikes brace 80 (Figs. 5 and 8). This contact of bar 56 turns the gate counterclockwise 90° until it is trailing the mounting block as it passes over sprocket 51. This turning brings follower face 64f in contact with block face 58f as shown in Fig. 14 and keeps the gate from swinging too far because of its inertia. If a narrow gate is used, this last turn may be omitted for it is not essential to the operation of the conveyer as a whole; but is desirable when using a wide gate so as to move the gate around the sprocket in the best manner and to clear parts of the frame that would be in the way if the gate were unturned.

The gate is in the trailing position as it returns to the other side of the machine along the lower part of chain 50, and the frictional contact of pin 59 provides sufficient resistance to free swinging to keep it in place. Before the gate is brought into contact again with cam 65, it must be turned backward through the 135° that it turned at the two points described. This turning is accomplished when the follower strikes the end of cam 67. How this is done is shown in Fig. 12 which illustrates the position of the same gate just before and just after turning.

On the lower end of cam bar 67 are fastened guide shoes 85, 86 and 87. The first two are fastened directly to the top and bottom respectively of bar 67 while shoe 87 is fastened on by a U-shaped clip 88 that passes over chain 50. Top and bottom guides 85 and 86 are bent to form a flaring mouth to receive and guide follower 64 against cam 67 as shown by the gate in position E in Fig. 12. The rounded corner of leg 64b strikes the end of the cam bar and stops; and as the chain continues to pull the gate on, the follower turns until the side of leg 64b is riding against the vertical side face 67b of cam 67 as shown at position F where the gate has swung through 135° from the position E. Vertical displacement of the follower from the shock of impact is prevented by guides 85 and 86 which are above and below the follower legs; horizontal displacement is prevented by guides 85 and 87 which are both above follower 64 and placed one on either side of the mounting block, now above the gate. Cam face 67b is in the same vertical plane as cam face 65a so that the leg 64b rides along cam 67 and onto cam 65, and the gate is delivered at the top of its path with the correct inclination, shown by position A of Fig. 4, to receive another loaf.

Returning to the position of the loaf when placed against stop 48 ready to be lifted by elevator 49 (Figs. 3 and 4) it will be remembered that the pusher arm at the rear end of the loaf is dropping vertically as illustrated in Fig. 6. The slices at this end are therefore no longer adequately held in place, especially after elevator 49 picks the loaf up and before it passes between plates 90 and 90a which are wrapping elements of the wrapper. Stop 48 is vertically alined with plate 90a and extends to within a short distance thereof, but there is of necessity a large gap between the arm 27b and plate 90. To hold up the end slices while passing this gap, there is provided a supporting means comprising spring plate 91 pivotally mounted on the upwardly curved end of extension 92 which is pivotally mounted on shoe 93 at 92a.

Shoe 93 is a flat sheet curved upwardly at one end and placed in the path of the bread as indicated in Figs. 6 and 8. It is located so as to be raised slightly by the loaf passing underneath. Shoe 93 is pivotally and slidably mounted on rod 94 by means of arm 95 which passes through an opening 47c in the side plate 47a, the arm 95 resting on the lower edge of the opening.

As a loaf is advanced by the infeed, its forward end engages the curved end of shoe 93 to raise the shoe by pivoting about rod 94, so that the shoe slides along the top of the loaf. After the loaf has passed into register with elevator 49, the shoe drops back into position with plate 91 pressing against the end of the loaf to hold up the slices as the pusher at 27b is being withdrawn. When the loaf has been elevated to a position between the plates 90 and 90a, these end folding plates hold the slices together for the period of wrapping.

Stop 48 and shoe 93 with plate 91 thus constitute means for engaging the loaf as it is moved into registering position for the purpose of confining the loaf endwise; and the loaf is held in unitary relation during the time it is in registration and not confined by the conveyer elements as well as during the time it is being moved into engagement with the plates 90, 90a to be confined endwise thereby. The shoe 93 is a part of the wrapper mechanism and holds plate 91 in alinement with plate 90 and stop 48 may if desired be integral with plate 90a, for to all intents and purposes the stop functions as a prolongation of plate 90 and a part of the wrapper mechanism.

Elevator 49 is the means for carrying the loaf upward past the wrapping elements. Surface plate 25 is cut away at the inner end so that the loaf is supported only along its edges by plate portions 25a and 25c (Fig. 3) so that elevator 49 can move upward underneath the loaf to lift it from plate 25. That the elevator may accommodate loaves of various lengths, it comprises upper plate 49a and lower plate 49b. The upper plate has attached to it bolts 45 and the lower plate has slots 49c through which the bolts pass; and by loosening the wing nuts on bolts 45, the two plates may be moved endwise to fit loaves of different sizes. Bolts 45 also move in slots in elevator arm 46 and the tightening of the wing nuts serves to clamp the plates onto the elevator arm.

If the maximum and minimum lengths of the elevator obtained by a pair of plates are not suitable for the range of loaf lengths, two or more separate sets of plates 49a, 49b having different lengths may be provided to give the required sizes. This may obviously be carried one step farther, and single fixed plates of the correct length provided for each size of loaf wrapped.

As the loaf is carried upwards, it moves past side plates 47 and 47a (Figs. 1 and 3), which are the conventional elements that fold the wrapping material around sides of the loaf; and between end plates 90 and 90a (Figs. 1 and 6), which are the conventional wrapping end folders. The members of both pairs of plates are adjustable toward and away from each other to accommodate loaves of different lengths and widths. It will be appreciated that the elevator and the side and end folding plates initially hold the sliced loaf together until the wrapping paper is folded around the loaf; and during the process of wrapping, the paper is held around the loaf by the side and end folding plates and other conventional wrapping elements in such a manner that the loaf is thereby held in unitary relation. After the wrapping process is completed, the wrapping material performs this function as the loaf is moved through the sealing means and on out of the wrapping machine.

To return to the carriage 12 and its adjustments, it will be remembered that the carriage is movable longitudinally relative to the wrapper frame to properly take loaves of different lengths, though it will be realized that during any single run loaves of only one length are wrapped. No adjustments of the infeed are required for changes in the loaf thickness or height; and I shall now describe the adjustments made in changing from Fig. 3, which shows the position of parts when set for a long loaf, to Fig. 4, which shows the parts set for a relatively shorter loaf.

In making these adjustments, the delivery conveyer maintains the same position and so the center line of the loaves moving on plate 114 is fixed. To accommodate the decreased length, the rails 123 are moved closer together, each one moving half of the decrement in loaf length. The carriage 12 is next moved, by turning lead screw 20, into the wrapper a distance equal to half of the change in loaf length. This changes the position of chain 28 and the pusher arms so that the arm at 27d (Fig. 4) reaches the end of the loaf in its initial position on the conveyer, i. e., a point substantially on the prolongation of the right hand rail 123, at the time the loaf reaches stop plate 83. The pusher 27b is moved by the change farther into the wrapper and maintains its position directly beneath plate 90, for plates 90 and 90a are simultaneously moved together (by means not shown) just as are rails 123.

The moving of carriage 12 to the left moves rod 75 in the same direction and rotates lever 72 in a counterclockwise direction. The lever moves cam bars 65 and 66, the two being connected, to the right. The movement of the cams is equal and opposite to the movement of the carriage for pivot 72a is located at the middle of lever 72. The moving of cam 66 carries end stop 48 to the right to maintain its alinement with plate 90a. The inclined cam faces 65b and 66b move toward the initial loaf position to keep the same position relative thereto and to the left hand rail 123. It is chiefly to effect this last change that the cam bars are made moveable with respect to the carriage.

The movement of rod 75 to the left is used to shift shoe 93 and the slice holding plate 91. Shifter 98 (Fig. 8) is fastened at its lower end to rod 75; and is forked at its upper end to straddle arm 95. Thus as the carriage is moved, shifter 98 slides arm 95 along rod 94 an amount equal to the carriage movement and, plate 91 maintains its vertical alinement with plate 90.

There only remains to shorten the distance between the gates and pusher, for moving of the carriage has shifted them as a unit without changing their spacing and the distance between any gate and the associated pusher arm is still the first loaf length. Means to correct this is shown in Fig. 15. The drive sprocket 53 for chain 50 is bolted to a hub 96 keyed to shaft 31. Hub 96 has a circular flange with arcuate slots 96a through which pass bolts 97 joining the hub and sprocket together. By loosening bolts 97 and rotating sprocket 53 clockwise about shaft 31, the chain 50 and gates 55 are moved to the right as viewed in Fig. 5. The gates are moved toward the associated pushers an amount equal to the decrement of loaf length, i. e., until the gate A and an arm at the position shown at 27d are now spaced the length of the short loaf, and the bolts 97 again tightened. The conveyer is now ready to function as before.

The above method of changing the spacing between the gates and pushers is preferred because of the wide range within which the adjustments may quickly and accurately be made. If only a few definite spacings were desired, it would be possible to provide in place of the adjustable sprocket additional mounting blocks 58, properly spaced, to which the gates could be transferred.

To adjust the slicer to hold sliced loaves in proper unitary relation, end rails 121 and 122 are mounted as are rails 123 and can be shifted apart or together as required in the same manner and amount as rails 123.

It will be understood that the drawings and description are to be considered merely as illustrative of and not as restrictive upon the broader claims appended hereto, for various changes in design, structure, and arrangement may be made without departing from the spirit and scope of said claims. Thus, though I refer in the description to sliced bread as the article handled by my feed means, I do so to conveniently refer to such article, for it will be readily apparent that my invention may be used to handle and convey any subdivided article or unit to which it is adapted.

I claim:

1. In a horizontally extending conveyer adapted to convey a subdivided unit, means to push the unit along the conveyer and confining means carried on the conveyer at the advancing end of the unit to hold the subdivisions thereof in unitary relation; said confining means comprising a pivotally mounted gate and means to swing the gate about its vertical axis at a predetermined point in its travel against the unit.

2. In a horizontally extending conveyer adapted to convey a subdivided unit, means to push the unit along the conveyer and confining means carried on the conveyer at the advancing end of the unit to hold the subdivisions thereof in unitary relation; said confining means comprising a pivotally mounted gate and means to swing the gate about its vertical axis at a predetermined point in its travel against the unit; and means to adjust the confining means and pushing means to receive units of various lengths.

3. In a horizontally extending conveyer adapted intermittently to receive a subdivided unit, a chain, a pusher arm on said chain to move the unit, a second chain parallel to the first mentioned chain, means to drive both chains in timed relation to each other, a gate movably mounted on the second mentioned chain, and means to move the gate about a vertical axis at a predetermined point in its horizontal travel to hold the unit between the gate and the pusher arm.

4. In a horizonally extending conveyer adapted intermittently to receive a subdivided unit, a chain, a pusher arm on said chain to move the unit, a second chain parallel to the first mentioned chain, means to drive both chains in timed relation to each other, a gate movably mounted on the second mentioned chain, a cam follower attached to the gate, and cams adapted to operate the follower to move the gate about a vertical axis at a predetermined point in its horizontal travel to hold the unit between the gate and the pusher arm.

5. In a horizontally extending conveyer adapted intermittently to receive a subdivided unit, a chain, a pusher arm on said chain to move the unit, a second chain parallel to the first mentioned chain, means to drive both chains in timed relation to each other, a gate pivotally mounted on the second mentioned chain, a cam follower attached to the gate, and a cam operating the follower; said cam being adapted to hold the gate at an angle inclined to the unit horizontally approaching the conveyer while said unit is inserted between the gate and pusher, and adapted to turn the gate through a horizontal angle at a predetermined point in its horizontal travel to hold the unit between the gate and pusher arm.

6. In a horizontally extending conveyer adapted intermittently to receive a subdivided unit, a chain, a pusher arm on said chain to move the unit, a second chain parallel to the first mentioned chain, means to drive both chains in timed relation to each other, a gate pivotally mounted on the second mentioned chain, a cam follower attached to the gate, and a cam operating the follower; said cam being adapted to hold the gate at an angle inclined to the unit approaching the conveyer while said unit is inserted between the gate and pusher, and adapted to turn the gate through a horizontal angle at a predetermined point in its horizontal travel to hold the unit between the gate and pusher arm; said cam being movable to adjust the point of turning the gate.

7. In a horizontally extending conveyer adapted intermittently to receive a subdivided unit, a chain, a pusher arm on said chain to move the unit, a second chain parallel to the first mentioned chain, means to drive both chains in timed relation to each other, a gate pivotally mounted on the second mentioned chain, a cam follower attached to the gate, and a cam having two sets of cam faces operating the follower; one of said sets of cam faces being adapted to hold the gate at an angle inclined to the unit approaching the conveyer while said unit is inserted between the gate and pusher, to turn the gate about a vertical axis at a predetermined point in its horizontal travel to hold the unit between the gate and pusher arm, and to release the gate from the turned position, and the other of said sets of cam faces being adapted to return the gate to its inclined position.

8. In a horizontally extending conveyer adapted intermittently to receive a subdivided unit, a chain, a pusher arm on said chain to move the unit, a second chain parallel to the first mentioned chain, means to drive both chains in timed relation to each other, a gate pivotally mounted on the second mentioned chain, a cam follower attached to the gate, and a cam comprising a pair of opposed cam faces along which the cam follower rides; said cam being adapted to hold the gate in a position inclined to the direction of motion of the gate and then to turn the gate about a vertical axis at a predetermined point in its travel to a position transverse to direction of gate motion to hold the unit between the gate and the pusher arm.

9. In a horizontally extending conveyer adapted intermittently to receive a subdivided unit, a chain, a pusher arm on said chain to move the unit, a second chain parallel to the first mentioned chain, means to drive both chains in timed relation to each other, a gate pivotally mounted on the second mentioned chain, a cam follower attached to the gate, and a cam comprising a pair of opposed cam faces along which the cam follower rides; said cam being adapted to hold the gate in a position inclined to the direction of motion of the gate and then to turn the gate about a vertical axis at a predetermined point in its travel to a position transverse to the direction of gate motion to hold the unit between the gate and the pusher arm; said cam being movable to adjust the point of turning the gate.

10. In a conveyer adapted to convey units of various lengths, the combination of a pair of travelling chains, a carriage carrying the chains and longitudinally adjustable, a pusher mounted on one chain, a gate movably mounted on the other chain, movable cam means adapted to move the gate at a certain point in its travel to engage the unit, means for adjusting the longitudinal position of one chain with reference to the other, and means to move the cam means equally and oppositely to adjustment movement of the carriage.

11. In a conveyer adapted to receive and deliver units of various lengths at positions centered on a receiving point and a delivery point respectively, a longitudinally adjustable carriage, a pair of conveyer chains mounted to move longitudinally on the carriage, means for driving the chains in timed relation to each other, said driving means including means for adjustably changing the longitudinal position of one chain relative to the other, a pusher mounted on one chain, a gate movably mounted on the other chain to be moved between unit engaging and disengaging positions, longitudinally movable cam means actuating the gate to move it to and from unit engaging position at certain points in its travel, and means for moving the cam means equally and oppositely to adjustment movement of the carriage.

12. In combination with a mechanism having a unit receiving way defined by unit confining members adjustable to receive various sized units centered at a predetermined point, and having a unit moving mechanism adapted to move units through the mechanism along a line through said point, an infeed conveyer mechanism feeding units along a path at right angles to said line of movement to a delivery position centered at said point, said infeed mechanism comprising a carriage adjustably movable along the line of feed, two chains mounted on the carriage to travel along the line of feed, means to drive the chains in timed relation to each other, a pusher mounted on one chain, a unit confining gate on the other chain and movable thereon to and from unit confining position, means whereby the relative position of the chains may be adjustably changed, cam means for actuating the gate to and from unit confining position, said cam means being adjustably movable along the line of travel.

13. In combination with a mechanism having a unit receiving way defined by unit confining members adjustable to receive various sized units centered at a predetermined point, and having a unit moving mechanism adapted to move units through the mechanism along a line through said point, an infeed conveyer mechanism feeding units along a path at right angles to said line of movement to a delivery position centered at said point, said infeed mechanism comprising a carriage adjustably movable along the line of feed, two chains mounted on the carriage to travel along the line of feed, means to drive the chains in timed relation to each other, a pusher mounted on one chain, a unit confining gate on the other chain and movable thereon to and from unit confining position, means whereby the relative position of the chains may be adjustably changed, cam means for actuating the gate to and from unit confining position, said cam means being adjustably movable along the line of travel, and means causing the cam means to be adjustably moved equally and oppositely to carriage adjustment movement.

14. In combination, a unit handling mechanism having a unit receiving way defined by opposed unit confining and guiding members adjustable to receive various sized units centered at a predetermined point, one of said members including a unit confining element adapted to move in behind a unit fed to the way along a line at right angles thereto, and having a unit moving mechanism adapted to move units through the defined way along a center line through said point, and an infeed conveyer mechanism feeding units along a path at right angles to said line of movement and past said unit confining element toward the opposite stationary confining and guiding member to a delivery position centered at said point, said infeed mechanism comprising a carriage adjustably movable along the line of feed, two chains mounted on the carriage to travel along the line of feed, means to drive the chains in timed relation to each other, a pusher mounted on one chain and adapted to be carried by that chain out of engagement with the fed unit just as the unit confining element of the unit handling mechanism moves in behind the unit, a unit confining gate mounted on the other chain and movable thereon to and from unit confining position, means whereby the relative positions of the chains may be adjustably changed to vary the distance between pusher and confining unit, and adjustable cam means for moving the gate to and from unit confining position and adapted to move the gate from unit confining position as the end of the fed unit comes into engagement with said opposite stationary confining member of the handling mechanism.

15. In combination, a unit handling mechanism having a unit receiving way defined by opposed unit confining and guiding members adjustable to receive various sized units centered at a predetermined point, one of said members including a unit confining element adapted to move in behind a unit fed to the way along a line at right angles thereto, and having a unit moving mechanism adapted to move units through the defined way along a center line through said point, and an infeed conveyer mechanism feeding units along a path at right angles to said line of movement and past said unit confining element toward the opposite stationary confining and guiding member to a delivery position centered at said point, said infeed mechanism comprising a carriage adjustably movable along the line of feed, two chains mounted on the carriage to travel along the line of feed, means to drive the chains in timed relation to each other, a pusher mounted on one chain and adapted to be carried by that chain out of engagement with the fed unit just as the unit confining element of the unit handling mechanism moves in behind the unit, a unit confining gate mounted on the other chain and movable thereon to and from unit confining position, means whereby the relative positions of the chains may be adjustably changed to vary the distance between pusher and confining unit, and adjustable cam means for moving the gate to and from unit confining position and adapted to move the gate from unit confining position as the end of the fed unit comes in engagement with said opposite stationary confining member of the handling mechanism, said cam means being adjustably movable along the line of feed, and means interconnecting the carriage and cam means so that they are adjusted equally and oppositely.

16. The combination of a delivery conveyer adapted to deliver sliced loaves of bread from a slicer at timed intervals, and a wrapper infeed conveyer adapted to receive loaves from the delivery conveyer at said timed intervals; said delivery conveyer having side rails to hold the sliced loaf together as it is moved along said conveyer and the rails being adjustably movable toward and away from each other to accommodate loaves of different lengths; said infeed conveyer comprising a travelling chain, a pusher arm on the chain to move the loaf in a direction transverse to the direction of delivery conveyer movement, a second travelling chain parallel to the first mentioned chain, means to drive both chains in timed relation, a gate movably mounted on the second chain, a cam follower on the gate, and a cam operating the follower to move the gate at a predetermined point to hold the slices together between the pusher and the gate; the infeed conveyer being bodily movable in a direction parallel to its feeding movement to compensate for a change in loaf length, whereby the pusher arm may be moved one-half of such change to maintain a position fixed with regard to the initial position of a loaf deposited on the infeed; the gate being separately movable relative to the pusher to maintain a position fixed relative to said initial loaf position; and said cam being automatically moved by the movement of the infeed an amount equal and opposite to the infeed conveyer movement to maintain a position fixed relative to said initial loaf position.

WILLIAM WALTER HARTMAN.